(12) United States Patent
Mann

(10) Patent No.: US 8,186,012 B2
(45) Date of Patent: May 29, 2012

(54) POLE GRIP WITH STORAGE COMPARTMENT

(75) Inventor: David G. Mann, Shreve, OH (US)

(73) Assignee: The Wooster Brush Company, Wooster, OH (US)

( * ) Notice: Subject to any disclaimer, the term of this patent is extended or adjusted under 35 U.S.C. 154(b) by 2007 days.

(21) Appl. No.: 10/861,436

(22) Filed: Jun. 3, 2004

(65) Prior Publication Data

US 2005/0271463 A1    Dec. 8, 2005

(51) Int. Cl.
*B25G 1/04* (2006.01)
(52) U.S. Cl. .......................... 16/111.1; 16/427; 403/377
(58) Field of Classification Search ............... 403/109.1, 403/109.3, 109.4, 109.7, 109.8, 377; 16/427, 16/429, 111.1
See application file for complete search history.

(56) References Cited

U.S. PATENT DOCUMENTS

| | | | |
|---|---|---|---|
| 4,642,837 A * | 2/1987 | Nichols et al. ................... | 15/171 |
| 5,288,161 A | 2/1994 | Graves et al. | |
| 5,324,082 A * | 6/1994 | McNaughton et al. ......... | 285/93 |
| 5,579,558 A | 12/1996 | Newman, Jr. et al. | |
| 5,682,641 A | 11/1997 | Newman, Jr. et al. | |
| 6,354,629 B1 * | 3/2002 | McNeal et al. ............... | 280/823 |
| 6,540,264 B1 * | 4/2003 | Yokoyama et al. ........... | 285/319 |
| 6,779,235 B2 | 8/2004 | Newman et al. | |
| 6,913,211 B2 * | 7/2005 | Chen ............................ | 239/532 |
| 2003/0135950 A1 | 7/2003 | Dove | |

* cited by examiner

*Primary Examiner* — Joshua Kennedy
(74) *Attorney, Agent, or Firm* — Renner, Otto, Boisselle & Sklar, LLP

(57) ABSTRACT

A grip for an extension pole has an opening at one end sized to receive the inboard end of the extension pole, and another opening at the other end communicating with a storage compartment inside the grip for storing at least a portion of an adaptor. A gripper inside the grip engages the adaptor when inserted into the storage compartment to prevent the adaptor from inadvertently falling out of the storage compartment.

17 Claims, 3 Drawing Sheets

POLE GRIP WITH STORAGE COMPARTMENT

FIELD OF THE INVENTION

This invention relates to a grip for extension poles and the like that contains a storage compartment for securely storing an adaptor that may be threaded into a standard internally threaded socket in a tool handle to permit the tool handle to be attached to poles having quick release lock mechanisms.

BACKGROUND OF THE INVENTION

Some types of extension poles have quick release lock mechanisms that allow for the quick and easy attachment and removal of tool handles to and from the poles. However, the tool handles must be provided with compatible end portions in order to work with such quick release lock mechanisms.

If the tool handles have standard internally threaded sockets, for example, the tools cannot be used with poles having such quick release lock mechanisms unless an adaptor that is configured to mate with the quick release lock mechanisms is first threaded into the tool handle socket.

Such adaptors are generally known. However, the operator/user of an extension pole equipped with such a quick release lock mechanism may not be aware of the availability of such an adaptor. Even if the operator/user is aware of such an adaptor, there is the potential for the adaptor being lost or misplaced when the operator/user wants to use the pole with a tool having a standard internally threaded tool handle.

SUMMARY OF THE INVENTION

The present invention relates to a grip for an extension pole and the like that has a storage compartment for securely storing an adaptor that allows tool handles having standard internally threaded sockets to be used with poles having quick release lock mechanisms so the adaptor is readily available when needed.

In accordance with one aspect of the invention, the grip has an opening at one end that is sized for receipt of the inboard end of a tubular pole portion and an opening at the other end communicating with a storage compartment inside the grip sized for storing at least a substantial portion of the adaptor.

In accordance with another aspect of the invention, the grip may have an internal shoulder intermediate the open ends that acts as a stop limiting the extent to which the inboard end of a tubular pole portion may be inserted into the grip.

In accordance with another aspect of the invention, the grip may have a gripper that is engageable with the adaptor during insertion of the adaptor into the storage compartment for securely retaining the adaptor within the storage compartment.

In accordance with another aspect of the invention, the gripper may comprise an inwardly extending annular rib intermediate the ends of the grip having an inner diameter that is smaller than the major diameter of a threaded end of the adaptor for engagement with the threaded end when inserted into the storage compartment to hold the adaptor in place in the storage compartment.

In accordance with another aspect of the invention, the annular rib may be made of a suitable flexible thermoplastic elastomer that allows the rib to distort and conform to the threaded end of the adaptor when inserted into the storage compartment, and creates sufficient friction between the rib and threaded end to prevent the adaptor from inadvertently falling out of the storage compartment or unscrewing itself from the rib.

In accordance with another aspect of the invention, the grip may be made of a suitable thermoplastic elastomer that has a relatively high slip resistance.

In accordance with another aspect of the invention, a reduced diameter bore may be provided inside the grip for receipt of the threaded end of the adaptor.

In accordance with another aspect of the invention, the radial rib may be provided at the forwardmost end of the reduced diameter bore.

In accordance with another aspect of the invention, a shoulder may be provided at the rearwardmost end of the reduced diameter bore to act as a stop for locating the adaptor inside the storage compartment with the head end of the adaptor extending out of the storage compartment.

In accordance with another aspect of the invention, an annular gap or recess may be provided between the inner diameter of the outboard end of the grip and a substantial portion of the length of the reduced diameter bore for receipt of the inboard end of a tubular pole portion.

These and other objects, advantages, features and aspects of the invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
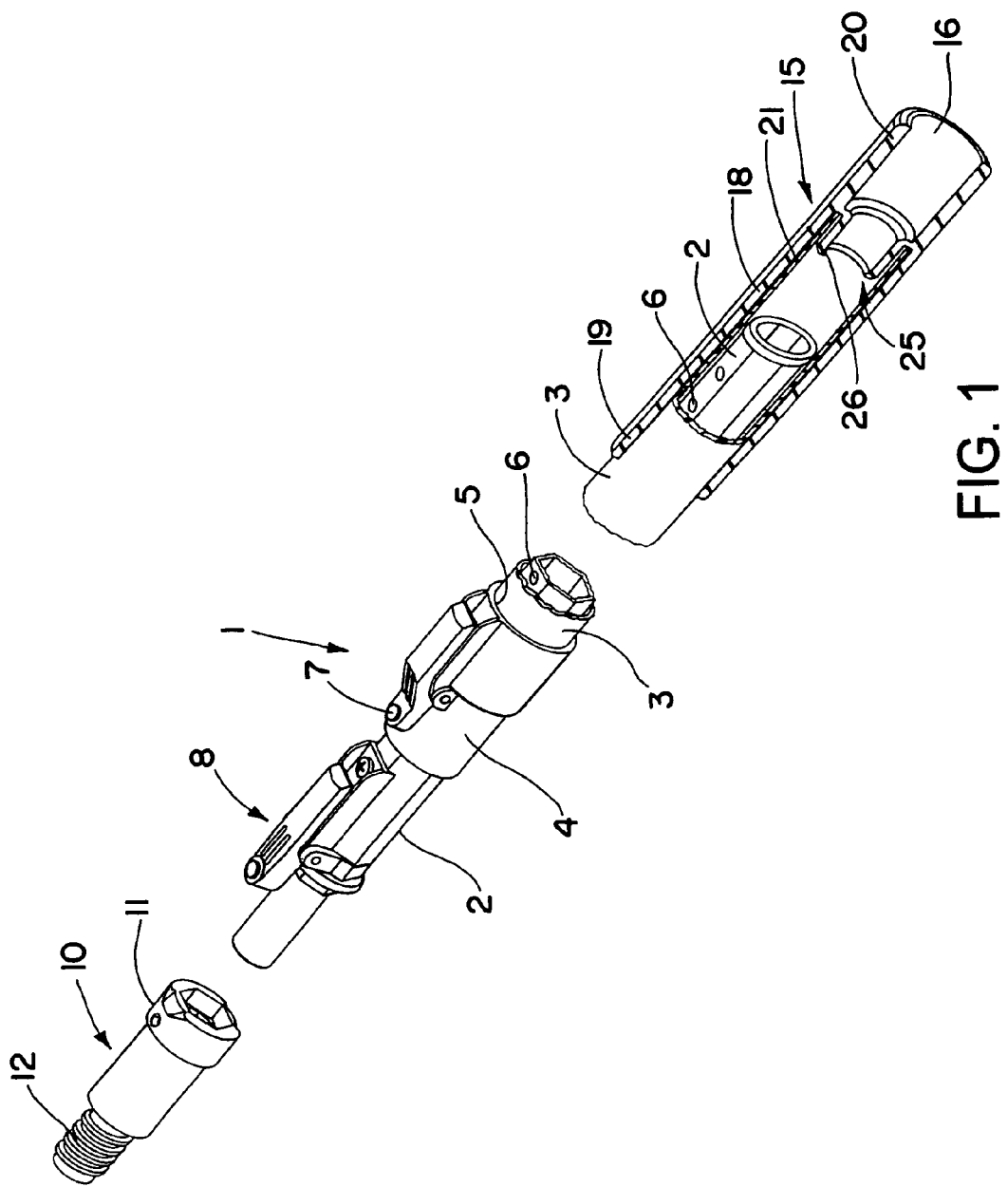
FIG. 1 is a fragmentary perspective view, partly in section, of an extension pole with quick release lock mechanism, having a grip with storage compartment of the present invention attached to the inboard end of the pole for securely storing an adaptor, shown at the outboard end of the pole, within the storage compartment when not in use.

Referring now in detail to the drawings, wherein like reference numerals are used to designate like parts, and initially to FIG. 1, there is shown one form of extension pole 1 including a pair of inner and outer telescoping tubular members 2 and 3 that may be positively locked in any one of a plurality of discrete longitudinally spaced positions as well known in the art. The outer tubular member 3 may be generally circular in cross section and has an inner diameter sufficiently greater than the outer diameter of the inner tubular member 2 for telescoping receipt of the inner member within the outer member. Both telescoping members are desirably made of a suitable lightweight material. For example, the outer telescoping member 3 may be made of a fiberglass material and the inner telescoping member 2 may be made of aluminum or other lightweight material.

Relative rotation between the telescoping members may be prevented as by making the inner telescoping member 2 noncircular in cross section (for example, hex shape) and providing a correspondingly noncircular shaped opening (not shown) in an end cap 4 on the outboard end 5 of the outer tubular member through which the inner telescoping member is axially slidable. Longitudinally spaced along the length of one side of the inner telescoping member 2 are a plurality of holes 6 that may be releasably engaged by a spring loaded pin 7 on the end cap 4 for releasably locking the telescoping members in any one of a plurality of longitudinally adjusted positions. Alternatively, the extension pole 1 may be of a fixed length if desired.

In some cases a quick release lock mechanism 8 of suitable type is provided on the outboard end of the extension pole 1 for ease of attachment and removal of the extension pole to and from the handle of a paint roller or other tool. The extension pole provides a handle extension for the tool, allowing the operator to reach areas that could not otherwise be reached without the aid of a ladder or the like. The lock mechanism 8 may be of any suitable type including, for example, any of the types disclosed in U.S. Pat. No. 5,288,161, the entire disclosure of which is incorporated herein by reference.

A disadvantage in providing extension poles with these types of lock mechanisms is that the tool handles must be provided with end portions that are compatible with the lock mechanisms. If the tool handles have a standard internally threaded socket, extension poles having such quick release lock mechanisms cannot be used with these tool handles unless a suitable adaptor 10 of the type shown, for example, in FIG. 1 (that has a head portion 11 on one end configured to mate with the quick release lock mechanisms and a threaded end portion 12 on the other end) is first threaded into the tool handle socket.

Tool handle adaptors of this type are generally known. However, the person using such an extension pole with quick release lock mechanism may not be aware of the availability of such an adaptor. Even if the person has such an adaptor, there is the potential for the adaptor being lost or misplaced.

To reduce the potential for losing or misplacing the adaptor when not in use, the extension pole 1 may be provided with a grip 15 which, in accordance with the present invention, has a storage compartment 16 for securely storing such an adaptor so the adaptor is readily available as needed. FIG. 1 shows an adaptor 10 removed from the storage compartment, whereas FIGS. 2 and 3 show an adaptor 10 securely stored within the storage compartment.

Grip 15 may be in the form of a tubular sleeve 18 having opposite open ends 19, 20. One of the open ends 19 may be sized for receipt of the inboard end 21 of the outer tubular pole portion 3. The other end 20 opens into the storage compartment 16 which is sized for receiving at least a substantial portion of the adaptor, namely, the reduced diameter threaded end portion 12 and the adjacent larger diameter portion 22, but not the enlarged head portion 11. As shown in FIGS. 2 and 3, when an adaptor 10 is fully inserted into the storage compartment, the head portion 11 of the adaptor desirably extends outwardly of the open end 20 of the grip. This has the advantage that not only can the operator/user readily see if the adaptor is stored in the storage compartment, the protruding head portion can easily be grasped by the operator to facilitate removal of the adaptor from the storage compartment when desired.

Inside the sleeve 18 is a gripper 25 that is engaged by the adaptor 10 during insertion of the adaptor into the storage compartment for securely retaining the adaptor within the storage compartment. The gripper may take many different forms. For example, the gripper may comprise a snap fit, one or more spring tabs, etc. However, in the embodiment disclosed herein, the gripper 25 comprises a radial annular rib 26 inside the sleeve intermediate the ends thereof.

Figure 2:
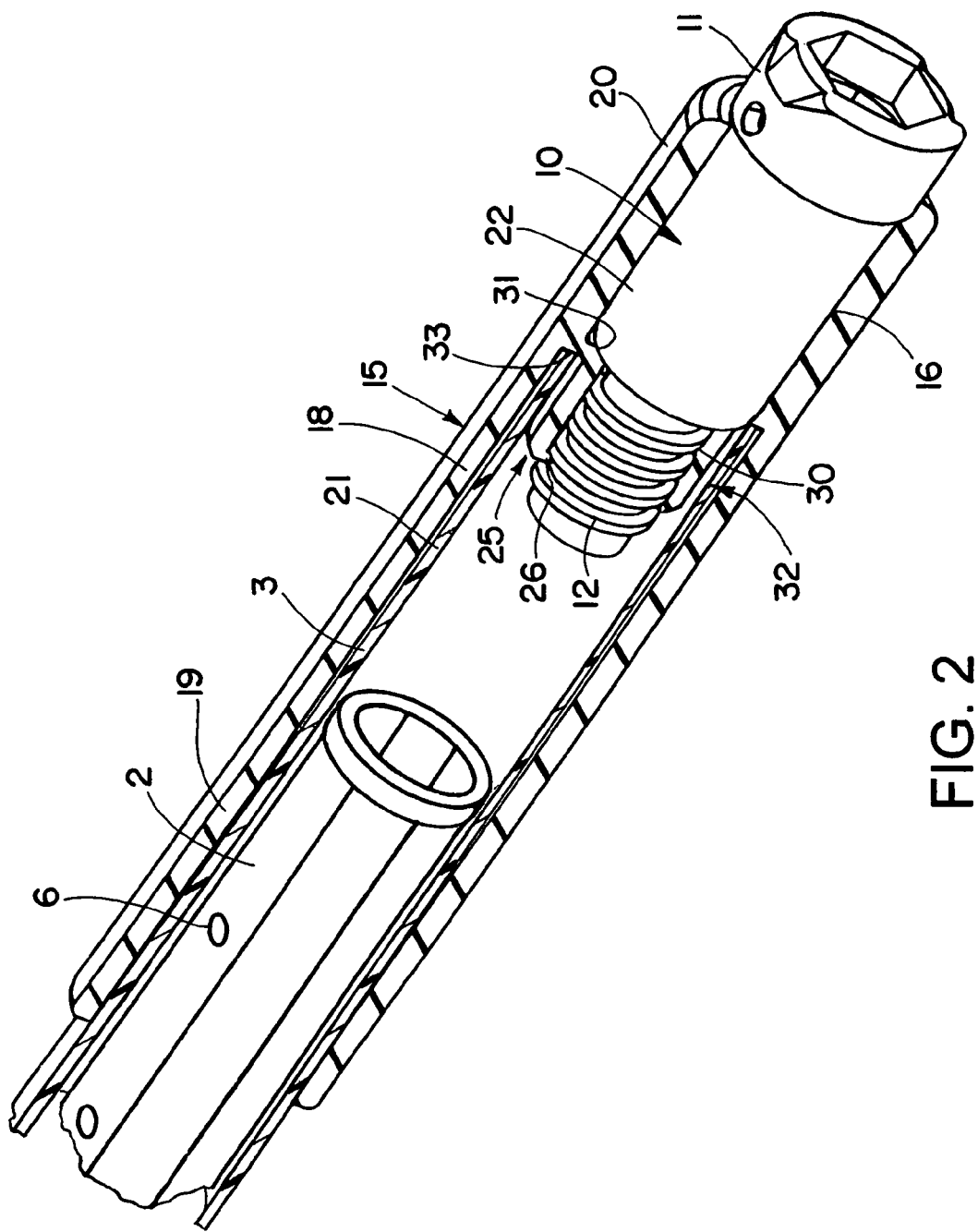
FIG. 2 is an enlarged fragmentary perspective view, partly in section, of the grip and inboard end of the extension pole of FIG. 1, showing the adaptor securely stored in the grip storage compartment.
Figure 3:
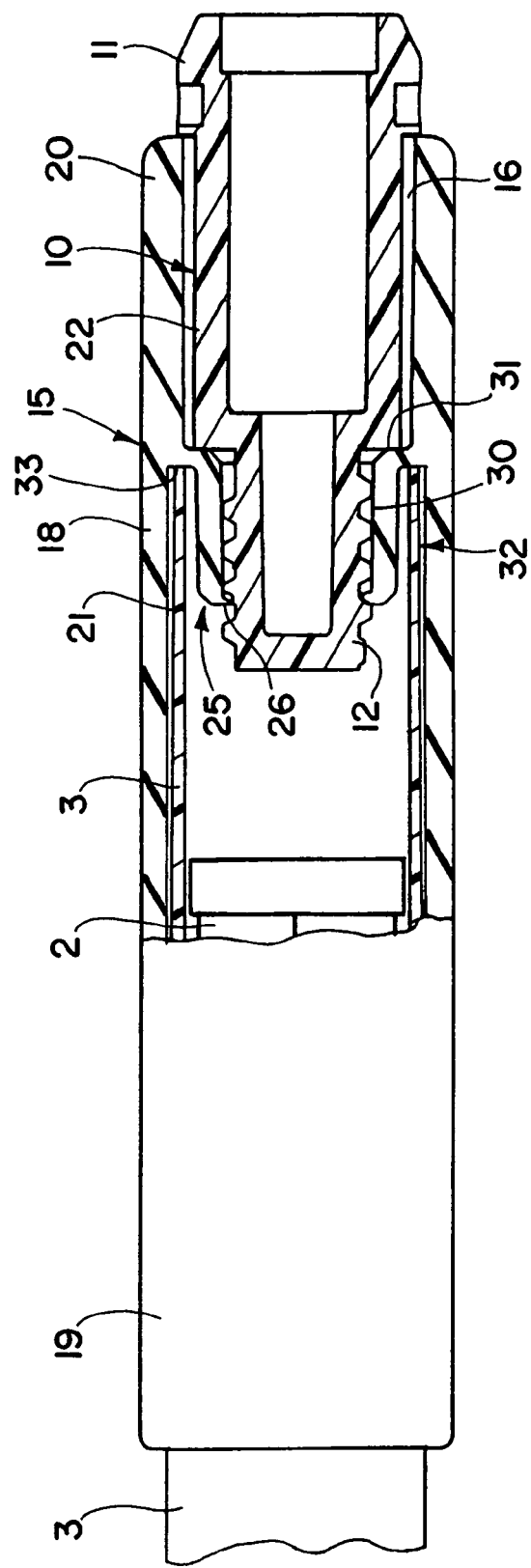
FIG. 3 is a fragmentary longitudinal section through the grip and inboard end of the extension pole of FIG. 2, showing the adaptor securely stored in the grip storage compartment.

As shown in FIGS. 2 and 3, rib 26 has an inner diameter that is smaller than the major diameter of the threaded end 12 of the adaptor. The grip 15 (including the rib 26) may be made of a suitable thermoplastic elastomer such as Santoprene. This provides the grip with an outer surface that has a relatively high slip resistance. Also, the elastomer gives the rib 26 sufficient flexibility to allow the rib to distort and conform to the threaded end of the adaptor during insertion of the adaptor into the storage compartment. In addition, because the elastomer has a relatively high frictional coefficient, when the rib engages the threaded end of the adaptor, the friction between the rib and threaded end will prevent the adaptor from inadvertently falling out of the storage compartment and will not allow the adaptor to unscrew itself from the rib. Yet when minimal intentional force is applied to the head portion of the adaptor by the operator/user, the adaptor can easily be pulled out of the rib or can be unscrewed from the rib.

A reduced diameter bore 30 may be provided inside the sleeve 18 intermediate the open ends for close sliding receipt of the reduced diameter threaded end portion 12 of the adaptor during movement of the threaded end portion into engagement with the radial rib which may be integral with the forwardmost end of the reduced diameter bore. A radial shoulder 31 at the rearwardmost end of the reduced diameter bore may act as a stop for locating the adaptor inside the storage compartment with the head portion of the adaptor extending out of the storage compartment as further shown in FIGS. 2 and 3.

An annular gap or recess 32 may be provided between the inner diameter of the open end 19 of the sleeve 18 and a substantial portion of the length of the reduced diameter bore 30 for receipt of the inboard end 21 of the outer tubular pole portion 3. This minimizes the length that the grip 15 needs to extend outwardly beyond the inboard end of the pole portion 3. Also this reduces the wall thickness of the reduced diameter bore 30 for a substantial portion of its length to reduce the amount of shrinkage that would otherwise occur in the grip during the manufacturing process if the wall thickness of the bore 30 were greater throughout substantially its entire length possibly causing the grip to pull or sink in. An internal shoulder 33 at the inner end of the gap or recess 32 acts as a stop limiting the extent to which the inboard end of the outer tubular pole portion may be inserted into the grip.

Although the invention has been shown and described with respect to a certain embodiment, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. In combination, a grip for an extension pole and an adaptor including means for providing an interface between tool handles and extension poles that are not otherwise connectable together, the adaptor being storable in the grip when the adaptor is not being used to provide such interface, the grip comprising a tubular sleeve having opposite open ends, one of the open ends being sized for receipt of an inboard end of an extension pole for tool handles, and the other of the open ends communicating with a storage compartment inside the sleeve sized for receiving at least a portion of the adaptor, the adaptor being removable from the storage compartment for use in providing such interface between tool handles and extension poles that are not otherwise connectable together, and a gripper inside the sleeve that is engageable by the adaptor during insertion of the adaptor into the storage compartment for retaining the adaptor within the storage compartment when not being used to provide such interface.

2. The combination of claim 1 wherein the gripper comprises a single annular rib extending radially inwardly inside the sleeve intermediate the open ends of the sleeve.

3. The combination of claim 2 wherein the rib has an inner diameter that is smaller than a major diameter of a threaded end of the adaptor for frictionally engaging threads on the threaded end when the adaptor is inserted into the storage compartment.

4. The combination of claim 3 wherein the rib is flexible to allow the rib to distort and conform to the adaptor threads during insertion of the adaptor into the storage compartment.

5. The combination of claim 3 wherein the rib is made of a thermoplastic elastomer having a relatively high frictional coefficient, whereby when the rib engages the adaptor threads, the friction between the rib and the adaptor threads will prevent the adaptor from inadvertently falling out of the storage compartment.

6. The combination of claim 1 wherein the sleeve is made of a thermoplastic elastomer that has a relatively high slip resistance.

7. The combination of claim 1 further comprising the extension pole having a tubular non-threaded inboard end inserted into the one open end of the sleeve, the sleeve having a forwardly facing internal shoulder intermediate the open ends that is engaged by the inboard end of the extension pole limiting the extent to which the inboard end of the extension pole extends into the one open end of the sleeve.

8. The combination of claim 1 wherein the sleeve has a rearwardly facing internal shoulder intermediate the open ends that is engaged by the adaptor when inserted into the storage compartment to limit the extent of insertion of the adaptor into the storage compartment so that a head end portion of the adaptor protrudes outwardly beyond the other end of the sleeve for grasping by an operator/user for ease of pulling the adaptor out of the storage compartment.

9. The combination of claim 1 further comprising a tool handle having an internally threaded socket and an extension pole having a quick release lock mechanism at an outboard end of the extension pole that is not directly connectable to the tool handle, wherein said means for providing such interface comprises a threaded end at one end of the adaptor that is threadable into the tool handle socket after the adaptor has been completely removed from the storage compartment and is engaged by the gripper during insertion of the threaded end of the adaptor into the storage compartment, and a head end at another end of the adaptor that is configured to mate with the quick release lock mechanism for releasably connecting the tool handle to the extension pole when the threaded end of the adaptor is threaded into the tool handle socket.

10. The combination of claim 1 further comprising a reduced diameter bore inside the sleeve intermediate the open ends for close sliding receipt of a threaded end portion of the adaptor.

11. The combination of claim 10 wherein the gripper comprises a single annular rib at a forwardmost end of the reduced diameter bore that extends radially inwardly inside the sleeve and has an inner diameter that is smaller than a major diameter of threads on the threaded end portion of the adaptor, and the rib is flexible for frictionally engaging the adaptor threads when the adaptor is inserted into the storage compartment.

12. The combination of claim 10 further comprising an annular gap immediately between the inner diameter of the one open end of the sleeve and a substantial portion of the length of the reduced diameter bore in which the inboard end of the extension pole is received.

13. An extension pole for tool handles comprising a tubular pole portion having an inboard end and an outboard end, a grip on the inboard end, and an adaptor including means for providing an interface between tool handles and extension poles that are otherwise not connectable together, the adaptor being storable in the grip when the adaptor is not being used to provide such interface, the grip comprising a tubular sleeve having an opening at one end in which the inboard end of the tubular pole portion is received, and another opening at the other end communicating with a storage compartment inside the sleeve for receiving at least a portion of the adaptor through the other end when the adaptor is not being used to provide such interface, the adaptor being removable from the storage compartment for use in providing such interface between tool handles and extension poles that are otherwise not connectable together, and a gripper inside the sleeve that is engageable by the adaptor when inserted into the storage compartment to prevent the adaptor from inadvertently falling out of the other end of the storage compartment when not being used to provide such interface.

14. The pole of claim 13 wherein the gripper comprises a single annular rib extending radially inwardly inside the sleeve, the rib having an inner diameter that is smaller than a major portion of a threaded end of the adaptor for frictionally engaging threads on the threaded end during insertion of the adaptor into the storage compartment, the rib being flexible to allow the rib to distort and conform to the adaptor threads during insertion of the adaptor into the storage compartment.

15. The pole of claim 13 wherein the outboard end of the pole portion has a quick release lock mechanism that is not directly connectable to a tool handle having a standard internally threaded socket, and said means for providing such interface comprises a threaded end at one end of the adaptor that is threadable into the tool handle socket after the adaptor has been completely removed from the storage compartment and is engaged by the gripper during insertion of the adaptor into the storage compartment, and a head end at another end of the adaptor that is configured to mate with the quick release lock mechanism for releasably connecting the pole portion to the tool handle when the threaded end of the adaptor is threaded into the tool handle socket.

16. The pole of claim 13 further comprising a reduced diameter bore inside the sleeve intermediate the ends for receipt of a reduced diameter end portion of the adaptor.

17. The pole of claim 16 further comprising an annular gap immediately between the inner diameter of the one end of the sleeve and a substantial portion of the length of the reduced diameter bore in which the inboard end of the pole portion is received.

* * * * *